(12) United States Patent
Wang et al.

(10) Patent No.: US 9,003,316 B2
(45) Date of Patent: Apr. 7, 2015

(54) ENTERING TECHNICAL FORMULAS

(75) Inventors: Kuansan Wang, Bellevue, WA (US);
Johnson Apacible, Mercer Island, WA (US); Bo-June (Paul) Hsu, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 459 days.

(21) Appl. No.: 13/189,560

(22) Filed: Jul. 25, 2011

(65) Prior Publication Data

US 2013/0031495 A1    Jan. 31, 2013

(51) Int. Cl.
*G06F 3/048*    (2013.01)
*G06F 3/00*    (2006.01)
*G06F 17/21*   (2006.01)

(52) U.S. Cl.
CPC .................................... *G06F 17/215* (2013.01)

(58) Field of Classification Search
None
See application file for complete search history.

(56) References Cited

U.S. PATENT DOCUMENTS

| | | | | |
|---|---|---|---|---|
| 5,251,292 | A * | 10/1993 | Martel et al. | 715/236 |
| 5,432,903 | A * | 7/1995 | Frid-Nielsen | 715/763 |
| 5,680,638 | A * | 10/1997 | Satoh | 715/204 |
| 5,717,939 | A * | 2/1998 | Bricklin et al. | 715/212 |
| 5,890,174 | A * | 3/1999 | Khanna et al. | 715/210 |
| 6,795,838 | B1 | 9/2004 | Kataoka | |
| 2006/0062470 | A1 | 3/2006 | Zhu et al. | |
| 2008/0066052 | A1 * | 3/2008 | Wolfram | 717/109 |
| 2009/0019015 | A1 | 1/2009 | Hijikata | |

OTHER PUBLICATIONS

US 7,092,574, 09/2006, Suzuki (withdrawn).
Abuein, et al., "Expanded grammar for detecting equivalence in math expressions", Retrieved at <<http://ieeexplore.ieee.org/stamp/stamp.jsp?tp=&arnumber=5276728>>,3rd IEEE International Conference on Digital Ecosystems and Technologies Jun. 1-3, 2009, pp. 575-580.
Adeel, et al., "Math Go! Prototype of a Content based Mathematical Formula Search Engine", Retrieved at <<http://www.jatit.org/volumes/research-papers/Vol4No10/15Vol4No10.pdf>>, Journal of Theoretical and Applied Information Technology Oct. 31, 2008, pp. 1002-1012.
Shatnawi, et al., "Equivalence Detection Using Parse-tree Normalization for Math Search", Retrieved at<<http://www.seas.gwu.edu/~ayoussef/papers/mathEquivShatnawi-ICDIM07.pdf>>,Retrieved Date: Apr. 19, 2011, pp. 6.
"Complexity Classes in Wolfram|Alpha", Retrieved at <<http://blog.wolframalpha.com/2011/02/21/complexity-classes-in-wolframalpha/#more-11075>>,Feb. 21, 2011, pp. 6.

* cited by examiner

*Primary Examiner* — Stephen Alvesteffer
(74) *Attorney, Agent, or Firm* — Dan Choi; Leonard Smith; Micky Minhas

(57) ABSTRACT

The claimed subject matter provides a method for entering technical formulas. The method includes receiving a sequence of inputs on a computing device. The sequence of inputs specifies the technical formula. The method also includes displaying the technical formula in response to receiving the sequence of inputs. Additionally, the method includes determining an alternate sequence of inputs that specify the technical formula. The alternate sequence of inputs may be input to the computing device to display the technical formula. The method further includes displaying the alternate sequence.

20 Claims, 8 Drawing Sheets

200

400

ENTERING TECHNICAL FORMULAS

BACKGROUND

The ability of a computing device to process complex equations is useful in a broad range of fields, including technical fields that use their own languages with specific symbols and syntaxes. For example, proprietary software tools, like LaTeX, MathML, and Chemical ML are used to solve complex mathematical and chemical problems. Any language, whether technical or not, may include structures such as statements, which are composed of symbols. For example, in the English language, a sentence is a statement that contains symbols of words with their associated meanings. Similarly, in the technical language of mathematics, mathematical formulas are statements with symbols for various constants, mathematical functions, etc. In chemistry, chemical equations are described using a language formed using a combination of symbols from the Periodic Table of the Elements; numeric values that can appear in subscript or superscript form; and symbols that represent the phases and the operations of each chemical term. The symbols of elements may be paired with numbers that represent the number of atoms of that element in a particular molecule.

Entering technical formulas into computers is challenging because these formulas may be complex. Further, the symbols of such languages may not translate to equivalents that can be readily entered into typical computer input devices. For example, it may be cumbersome to type written language equivalents of complex mathematical functions on a typical keyboard or touch screen. The range of possible symbols may also be too wide and diverse as to make it impractical and burdensome to fit into the standard computer input device.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter provides a method for entering technical formulas. The method includes receiving a sequence of inputs on a computing device. The sequence of inputs specifies the technical formula. The method also includes displaying the technical formula in response to receiving the sequence of inputs. Additionally, the method includes determining an alternate sequence of inputs that specify the technical formula. The alternate sequence of inputs may be input to the computing device to display the technical formula. The method further includes displaying the alternate sequence.

Additionally, the claimed subject matter provides a system for entering technical formulas. The system may include a processing unit and a system memory. The system memory may include code configured to direct the processing unit to process user-entered technical formulas. A sequence of inputs is received on a computing device. The sequence of inputs specifies a first part of a technical formula. A second part of the technical formula is determined based on the first part. The technical formula is displayed. An alternate sequence of inputs is determined that specifies the technical formula. The alternate sequence of inputs may be input to the computing device to display the technical formula. The alternate sequence is presented.

Further, the claimed subject matter provides one or more computer-readable storage media. The computer-readable storage media may include code configured to direct a processing unit to process user-entered technical formulas. A sequence of inputs is received on a computing device. The sequence of inputs specifies a technical formula. The technical formula includes a first part entered in a first input modality, and a second part entered in a second input modality. The technical formula is determined based on the sequence of inputs. The technical formula is displayed. An alternate sequence of inputs is determined that specify the technical formula. The alternate sequence of inputs may be input to the computing device to display the technical formula. The alternate sequence is presented in the second input modality.

DETAILED DESCRIPTION

Figure 1A:
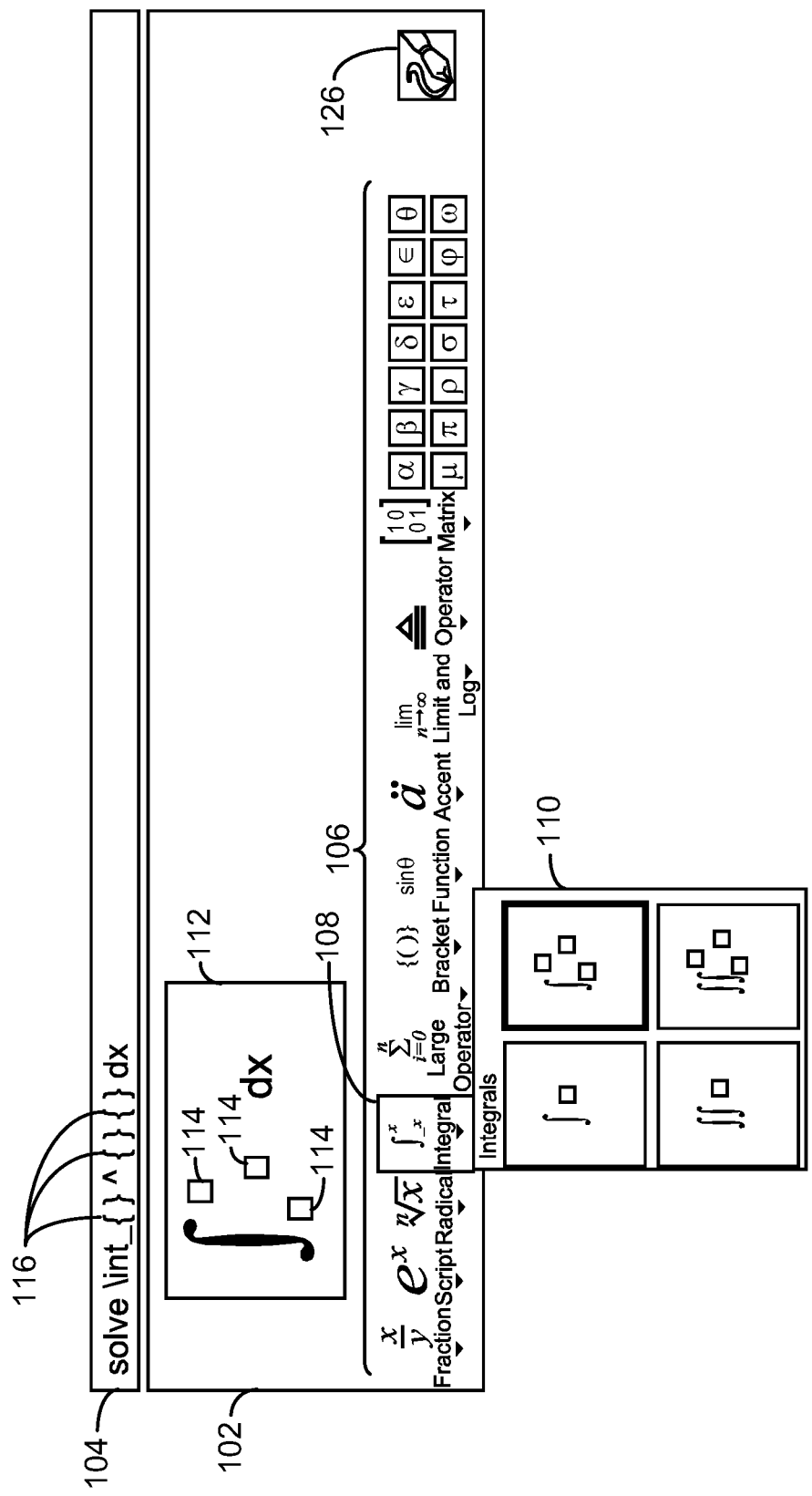
FIGS. 1A-1D are a series of diagrams of an interface in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

One approach to entering technical formulas on computing devices is to adopt specific conventions. For example, some proprietary software tools have conventions for entering specific escape characters and markup tags to represent non-lexical symbols. Non-lexical symbols are symbols that do not have keyboard-equivalent characters. This approach has many challenges. Learning the conventions may be resource intensive. Further, the escape characters and markup tags may be difficult to read, which makes them challenging to verify for accuracy. Another approach for entering technical formulas uses a graphical user interface (GUI), where symbols are presented visually, and selected using a pointing device or gestures. While GUI tools are easier to use than escape characters and markup tags, the use of GUI tools is generally tedious, and slower than entering text. Further, a user that is proficient at a GUI based tool may not understand how to use software tools that are limited to text inputs. Technical formulas also include inherent syntactic and semantic constraints that may not be well understood by the user. Syntactic constraints involve the syntax of a technical formula, and the syntax of a particular input method. A fraction having two parts is an example of a syntactic constraint. The semantic constraints involve how the entry of the formula's various symbols may constrain subsequent input entries. An example semantic constraint for a summation constrains the upper bound to be larger than the lower bound.

In one embodiment, the inherent syntactic and semantic constraints underlying technical formulas may be used to form a multimodal grammar for inputs. These multimodal grammars may provide for multiple input modalities for entering technical formulas that may be used interchangeably. Input modalities are the different ways a user may enter inputs to a computing device. The forms of input modalities vary widely, and may include hardware and software solutions. A small sampling of input modalities includes moving pointers across, and making selections on, a GUI interface; typing escape characters on keyboards into a text interface; making sounds into a voice recognition interface; making gestures in front of camera; using touch and handwriting interfaces; etc.

By providing multiple modalities for input, the user may enter a technical formula using a first modality, e.g., a GUI interface, and be shown how to input that same formula using a second modality, e.g., a text interface. The user may also alternate between the GUI interface and the text interface while entering a single formula or statement. Further, the user may be provided visual feedback, including assistance with syntax and semantic error checking. It is noted that while the following examples use GUI and text interfaces, embodiments of the claimed subject matter may include any number of potential input modalities, configured to operate in the manner described below. Further, a single input modality may be used with a number of alternate input sequences to produce the same formula. For example, text inputs using different symbolic languages may be used to produce the same formula.

In one embodiment, input modality may be switched while composing a technical formula. This may be done while also providing the equivalent inputs in the same and other modalities as feedback. For example, when users enters a formula for fractions via the keyboard, a fraction icon may be highlighted in a GUI interface, thereby indicating to the user that an equivalent input would be to click on the fraction icon. Similarly, if users click on the fraction icon, the formula for fractions, e.g., "\frac{ }{ }" may be displayed in a text input box, thereby indicating to users that the displayed textual input may have been typed instead. This may be done without having to move back and forth between the keyboard and mouse to request the different inputs be shown.

In another embodiment, feedback may be provided readily to users so that users may learn corresponding inputs to their input mouse, touch, handwriting, speech, etc., inputs. This enables user to enter expressions more quickly or efficiently, via a keyboard, for example. This feedback may also present the generated formula in a manner that makes the formula, or input, easier to understand and validate. For example, the visual expression of a textual input may appear more cluttered in comparison to images of GUI selections. Further, embodiments may provide the feedback respective to the actual inputs, and the switching of modalities during composition of the technical formula. In this way, the feedback may enable users to more efficiently construct technical formulas.

Future generation of technical formulas may be improved, also, through the sharing of alternate input modalities with associates known socially, over social networks, etc. In one embodiment, a canonical semantic-preserving textual representation of non-textual inputs is defined so that the non-textual inputs may be more easily stored, and shared with others. For example, if a user draws an equation, the user may convert the formula to a canonical textual representation, and use this representation instead of the raw image when sharing with an associate for work or study.

FIG. 1A is a diagram of an interface 100 for entering mathematical formulas, in accordance with the claimed subject matter. The interface 100 may include a GUI interface 102 and a text interface 104. The GUI interface 102 may be used to enter mathematical formulas by pointing and clicking on the various options 106 shown in the GUI interface 102. Alternately, the GUI interface 102 may represent a touch interface, where the user makes selections from the various options 106. The text interface 104 may be used to enter formulas through a keyboard. The interface 100 also includes a handwriting icon 126. The handwriting icon 126 may be selected to switch to a handwriting interface. The handwriting interface may enable the user to enter formulas by making strokes on a touch-sensitive surface.

With the GUI interface 102, the user may select the integral 108, then the definite integral format 110. In response, a formula 112 may be displayed. These GUI events may trigger an automatic synchronization with the text interface 104. In this way, the user may be shown how to enter that same formula 112 using the text interface 104. For example, in response to the selections entered on the GUI interface 102, the text interface 104 may be updated to display a sequence of escape characters and markup tags that produces the same formula 112. As shown, the text interface 104 displays, "solve \int_{ }^{ }dx." Accordingly, an alternate way to create the formula 112 is for the user to enter "solve \int_{ }^{ }dx," in the text interface 104. As shown, the interface 100 may also display empty boxes 114 in the GUI interface 102, based on the semantics of the formula 112. For example, the semantics of the definite integral may provide for additional inputs for the bounds and the function. Similarly, the text interface 104 includes brackets 116 in the text interface 104 to represent these fields. Both the boxes 114 and the brackets 116 may represent placeholders for further inputs from the user. In this way, the empty boxes 114 and brackets 116 may be a cue to the user to provide the values for these inputs. In this example, the placeholders may represent the lower bound, upper bound, and the function of the definite integral shown in the formula 112. These placeholders are also referred to herein as right hand nodes due to their role as right hand nodes of production rules for the various formula entered as described. Production rules map symbolic representations in technical formulas to specific inputs. Right hand nodes serve as placeholders for constants, expressions, etc., that are parts of technical formulas. Production rules are described in greater detail with respect to FIG. 2.

Figure 1B:
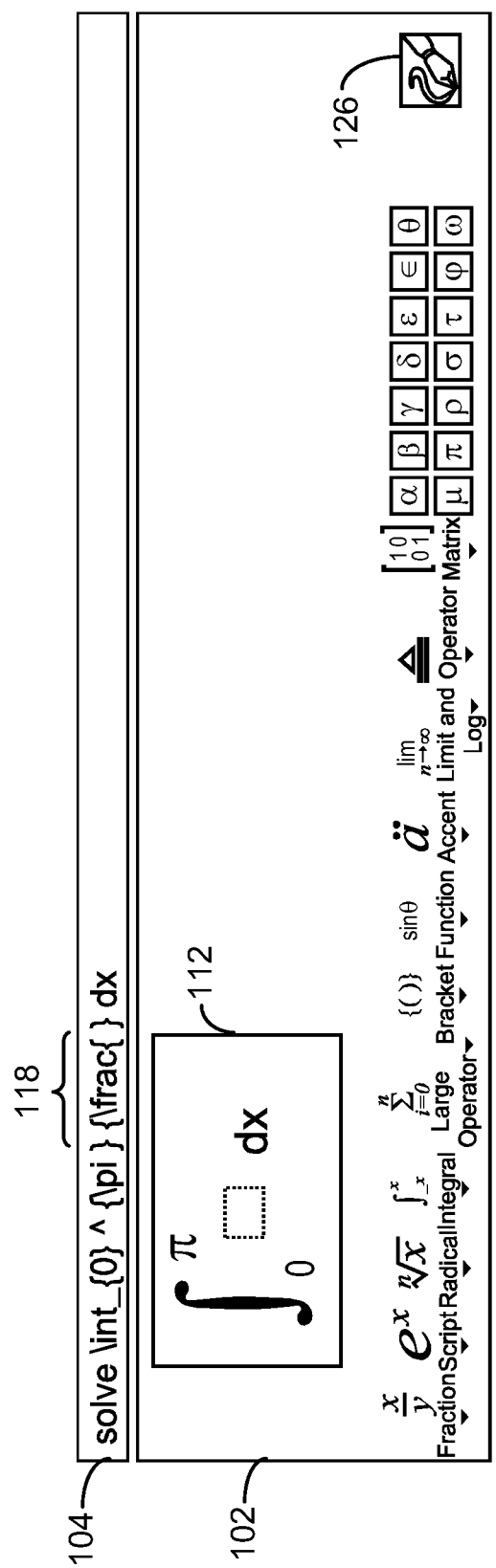

FIG. 1B is a diagram of the interface 100 for entering mathematical formulas, in accordance with the claimed subject matter. As shown, the placeholders are updated to include the values "0," and "π," for the lower and upper bounds, respectively, of the formula 112. Further, the text interface 104 also shows the updated bounds, "{0}^{pi}," even though the user may not have entered any text directly into the text interface 104. However, as stated previously, the user may alternate between input modalities. As such, the user may alternate from the GUI input modality, to a text input modality by typing the text entry 118 into the text interface 104. As shown, the text entry 118 is "\frac{." This may represent an escape code for entering fractions in the formula 112. Similar to providing placeholders in response to GUI interface inputs, the interface 100 may be updated to provide placeholders in response to text interface inputs.

Figure 1C:
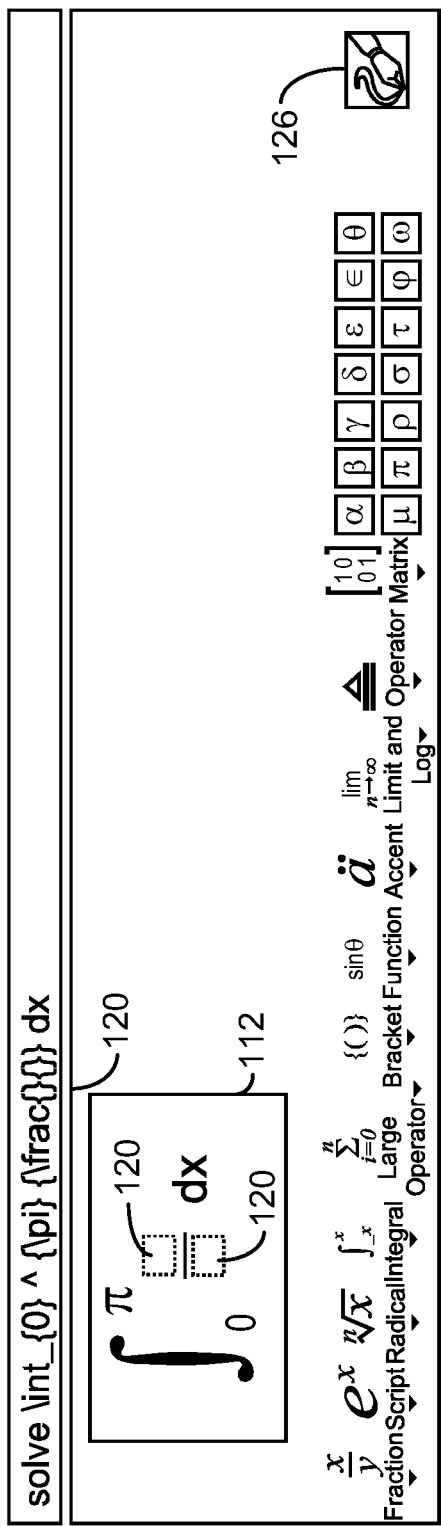

FIG. 1C is a diagram of the interface 100 for entering mathematical formulas, in accordance with the claimed subject matter. As shown, the placeholders 120 are provided for the user to enter values in the numerator and denominator of the fraction. Advantageously, these placeholders may be automatically filled in to help users that do not remember the specific syntax. For example, when a user enters the text, "\int{," the command may be automatically completed with all appropriate placeholders.

Figure 1D:
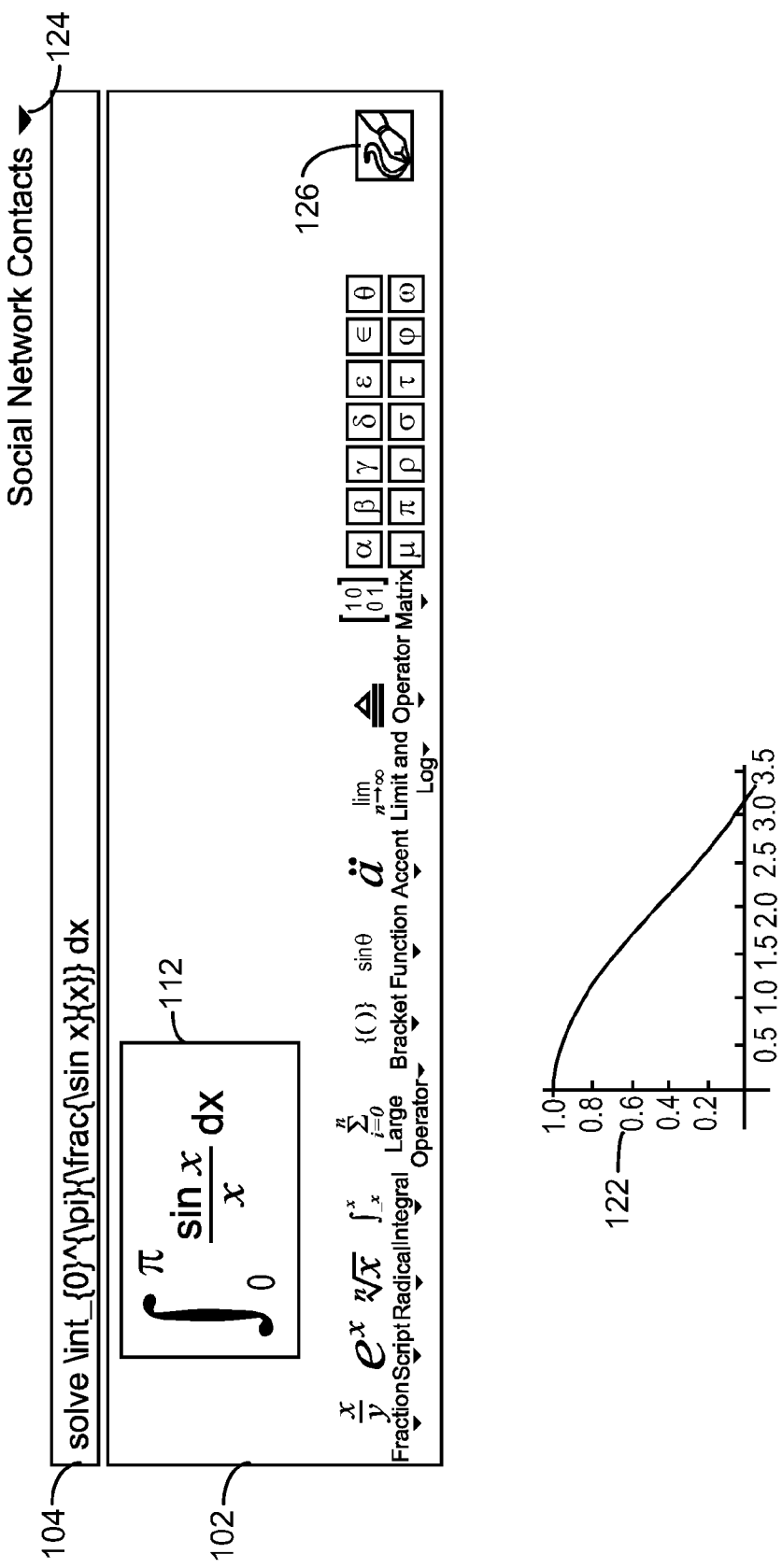

FIG. 1D is a diagram of the interface 100 for entering mathematical formulas, in accordance with the claimed subject matter. As shown, the formula 112 is fully entered. As such, the mathematical formula 112 may be processed, and provide a result, such as the graph 122. Further, the interface 100 may provide the user a way to preserve the knowledge gained by presenting the alternate input method for generating the formula 112. In one embodiment, the text interface input, "solve \int_{0}^{pi} {\frac{\ sin x} {x}}dx," may be saved to a local cache. In another embodiment, the text interface input may be communicated to an associate, such as a social network contact, by clicking on a button 124. In addition to showing alternate input sequences in alternate input modalities, an alternate input sequence may also be shown for the same input modality. For example, an alternate input may use a different symbolic or text language. The alternate input may also be image or picture based, where a different set of images is shown depending on the user's age, abilities, etc.

Figure 2:
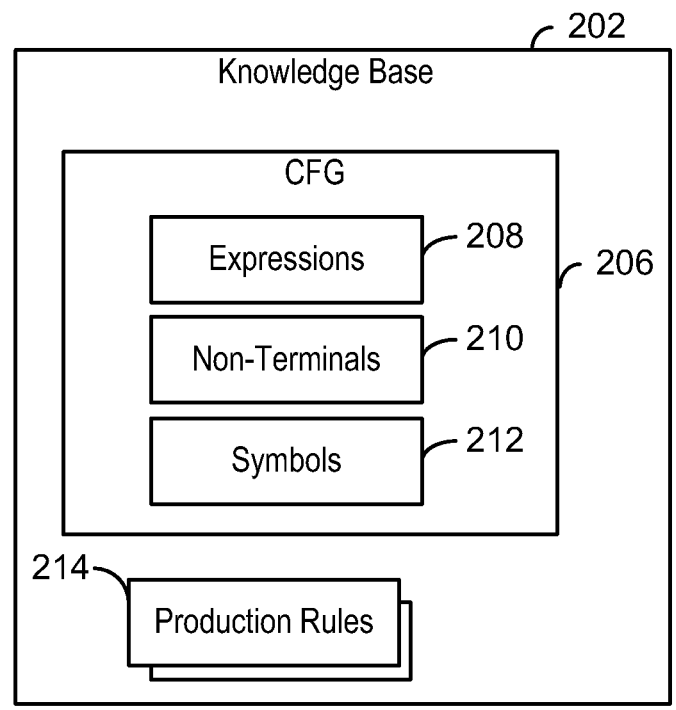
FIG. 2 is a block diagram of a system for entering technical formulas in accordance with the claimed subject matter.
Figure 2:
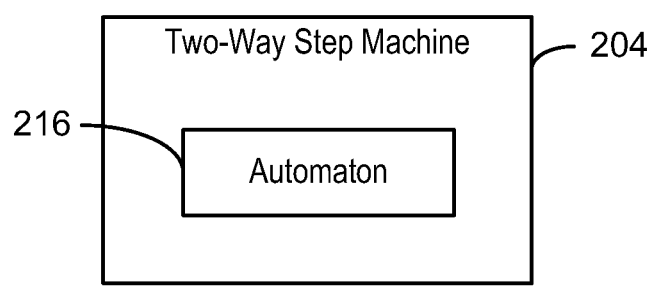

FIG. 2 is a block diagram of a system 200 for entering technical formulas in accordance with the claimed subject matter. The system 200 includes a knowledge base 202, and a two-way step machine 204. The knowledge base 202 may include a context free grammar (CFG) 206 that describes expressions 208. An example knowledge base 202 may include expressions 208, such as math formulas, where the syntactic definitions of the operators, and their operands, can be written in the CFG 206. The CFG 206 specifies the syntax of valid expressions 208. The expressions 208 may be organized in non-terminals 210 and symbols 212. The non-terminals 210 may describe a semantic component of an expression. Each non-terminal 210 can be described with a set of production rules 214. These production rules 214 show how different components of an expression can be composed from other non-terminals 210 and symbols 212. The symbols 212 may be content that appears in the input. In the CFG 206, valid input expressions may be recursively defined. For example, Expression 1 represents an example math expression, expr. In Expression 1, non-terminals 210 are represented in bold, and symbols 212 are represented in italics.

| EXPRESSION 1 | |
|---|---|
| expr→ | number OR |
| | constant OR |
| | expr + expr OR |
| | *\frac*{expr} {expr} OR |
| | *\int*_{expr} {expr}{ } *dx* |
| constant→ | *\pi* OR |
| | *\infinity* |

According to Expression 1, expr may be recursively defined by other expr's.

The knowledge base 202 may also include production rules 214. The production rules 214 map expressions 208 to input sequences for corresponding input modalities. Each production rule 214 may describe a set of valid expansions of non-terminals 210. In the production rules 214, expansions and terminal symbols may have different representations in different modalities. Table 1 lists some example production rules 214:

| TABLE 1 | | |
|---|---|---|
| NON-TERMINAL | TEXT | GUI |
| constant | \pi | π |
| expr | \frac{expr}{expr} | expr |
| | | expr |

The production rule may be expressed in the format of A→x, where A is a non-terminal node, and x is a string of non-terminal nodes or terminal symbols that match the inputs of a particular input modality. In other words, the knowledge base 202 may map inputs to specific operators and operands.

The contents of the knowledge base 202 may be indexed by knowledge that is expressible in automaton 216, which are operable by the two-way step machine 204. The automaton 216 is a system that can interpret an input sequence as production rule expansions in the CFG 206. For example, the two-way step machine 204 may use the automaton 216 to determine that the text input sequence, "\frac{1} {\pi} is a valid expression 208, expr, by using Production rule 1:

| PRODUCTION RULE 1 |
|---|
| expr→\frac{expr}{expr} |
| expr→number |
| number→1 |
| expr→constant |
| constant→\pi |

The two-way step machine 204 may use the automaton 216 in two ways. The first way involves processing user inputs, and changing internal states of the automaton 216 in response to the sequence of user inputs. The second way involves the two-way step machine 204 suggesting what subsequent input is likely to follow, where this determination is based on the current state of the automaton.

The automaton 216 may be used by the two-way step machine 204 to determine if an input sequence is valid according to the CFG 206. If the input sequence is valid, the automaton 216 may be used to determine which production rules 214 were used to generate the input sequence. Additionally, the automaton 216 may be used to identify completions of the input sequence. For example, if the user has typed, "\frac{", on a keyboard, the automaton 216 may determine that 2 sets of matched braces follow. Accordingly, the two-way step machine 204 may automatically complete the input sequence for the user, resulting in a displayed input of, "\frac{ } { }." Further, using the automaton 216, the two-way step machine can determine the corresponding representation in other input modalities. For example, once the production rule 214 for the "\frac{1} {\pi}," input is determined, the corresponding GUI input may be determined, and displayed on the interface 100. While GUI input is used as an example, other input modalities could be represented, such as a spoken representation, "one divided by pi." Animated graphics of gestures on a touch interface may be represented, etc.

This system 200 allows users to interact with the automaton in text, touch, GUI, and other modalities by creating parallel grammars among the modalities. Instead of defining the non- or terminal symbols tailored to a modality (e.g. text), the system 200 introduces an input-modality independent notion for all the automaton specifications. A modality independent node consists of the union of the corresponding modality-dependent nodes. When one modality dependent production rule is fulfilled to fill up a modality dependent node, all other parallel modality dependent nodes under the same modality independent node are automatically synchronized. In this way, the internal states of the automaton can be advanced in any input modalities and in any sequence of combinations.

Figure 3:
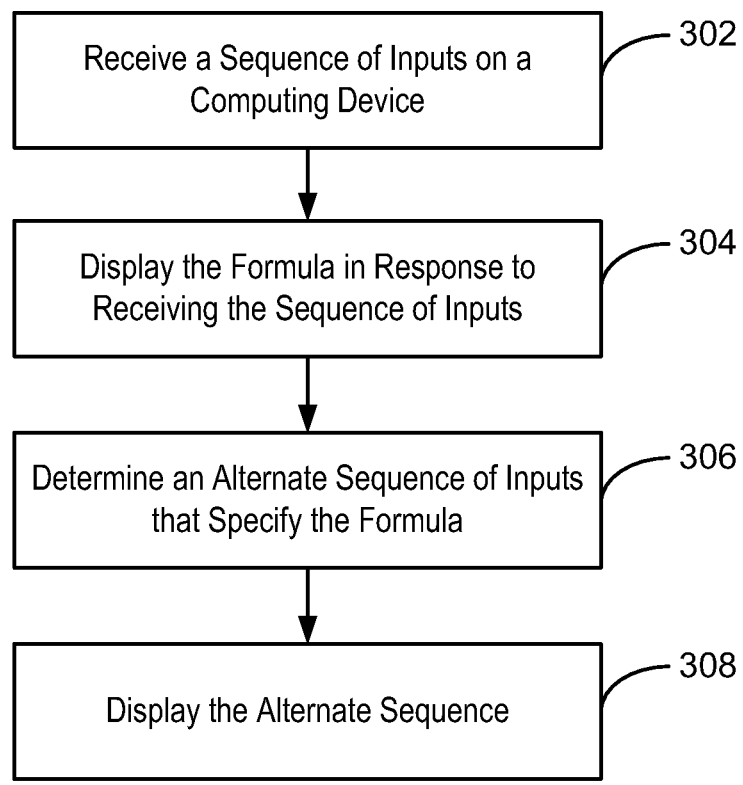
FIG. 3 is a process flow diagram of a method for entering technical formulas in accordance with the claimed subject matter.

FIG. 3 is a process flow diagram of a method 300 for entering technical formulas in accordance with the claimed subject matter. The two-way step machine 204 may perform the method 300. The method 300 begins at block 302, where a sequence of inputs may be received on a computing device. The computing device may be a mobile device, including any typical electronic device with a processor, memory, and collection of input-output devices. The input-output devices of the computing device may make up a number of input modalities for the computing device.

At block 304, the two-way step machine, may display a technical formula in response to receiving the sequence of inputs. In an analytical mode, the two-way step machine 204 may determine the formula that the user is entering. For example, in response to the user making selections on the GUI interface 104, the two-way step machine 204 determines that the user is entering the formula 112. The formula 112 is then displayed.

At block 306, the two-way step machine 204 determines an alternate sequence of inputs that specify the formula. The alternate sequence of inputs are based on a different input modality than used to enter the original sequence of inputs. For example, referring back to FIG. 1A, the original input modality is the GUI selection, the alternate input modality is text entry.

At block 308, the alternate sequence of inputs may be displayed. As shown in FIGS. 1A-1D, the alternate sequence of escape codes and markup tags is displayed in the text interface 104. While this example uses GUI and text input modalities as an example, there may be more than two possible input modalities. Further, the input modalities could take many forms including speech, gesture, etc. Accordingly, alternate sequences of inputs involving gestures, sounds, may be to provide video or audio to the user.

Figure 4:
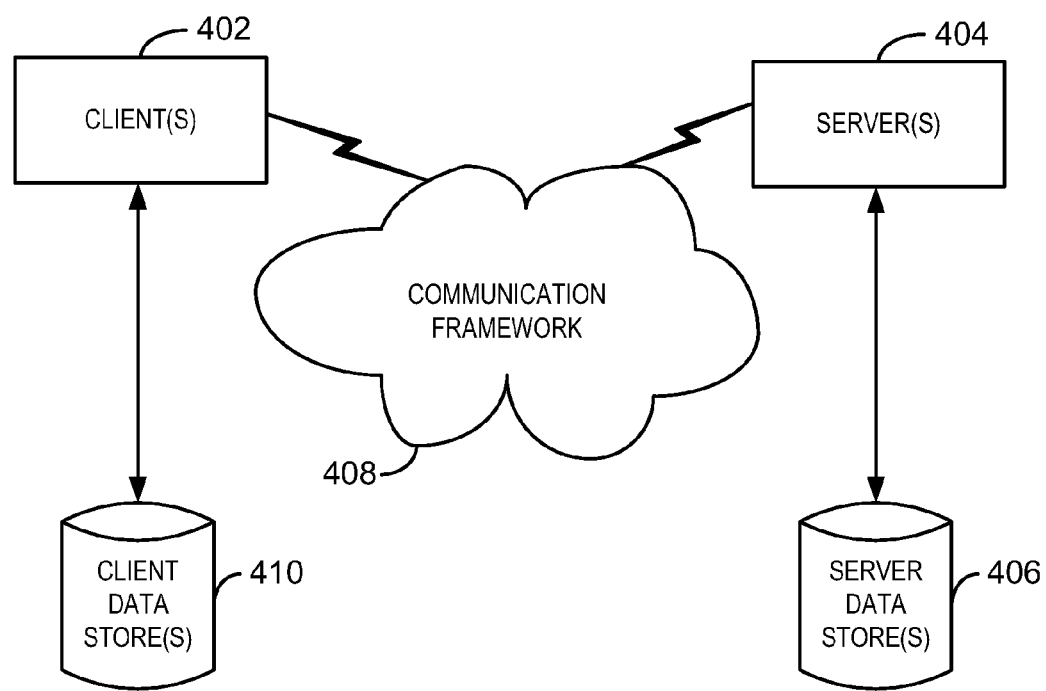
FIG. 4 is a block diagram of an exemplary networking environment wherein aspects of the claimed subject matter can be employed.

FIG. 4 is a block diagram of an exemplary networking environment 400 wherein aspects of the claimed subject matter can be employed. Moreover, the exemplary networking environment 400 may be used to implement a system and method that enables the entering of technical formulas, as described herein.

The networking environment 400 includes one or more client(s) 402. The client(s) 402 can be hardware and/or software (e.g., threads, processes, computing devices). As an example, the client(s) 402 may be a mobile device, accessing a search engine over a communication framework 408, such as the Internet. The client 402 may begin to enter a technical formula for solving on a search engine client. The search engine client is distinct from the client 402, in that the client 402 represents a device. In contrast, the client of the search engine may be a visual interface, such as an entry box for a search field. In one embodiment, the search engine client is configured to solve technical formulas, such as mathematical formulas.

The environment 400 also includes one or more server(s) 404. The server(s) 404 can be hardware and/or software (e.g., threads, processes, computing devices). The server(s) 404 may include network storage systems. The server(s) may be accessed by the client(s) 402. The servers 404 may determine the formula that is being entered on the client 402, and update the search engine client to display the entered formula. The servers 404 may also determine alternate input grammars for entering the same formula in an alternate input modality. Further, the servers 404 may communicate such information to the client 402.

One possible communication between a client 402 and a server 404 can be in the form of a data packet adapted to be transmitted between two or more computer processes. The environment 400 includes a communication framework 408 that can be employed to facilitate communications between the client(s) 402 and the server(s) 404. In one embodiment, the client 402 and the server 404 may be included on the same device, and not in communication over the communication framework 408.

The client(s) 402 are operably connected to one or more client data store(s) 410 that can be employed to store information local to the client(s) 402. The client data store(s) 410 may be located in the client(s) 402, or remotely, such as in a cloud server. The client data store(s) 410 may include input grammars from a history of technical formula entries on the client 402. Similarly, the server(s) 404 are operably connected to one or more server data store(s) 406 that can be employed to store information local to the servers 404.

Figure 5:
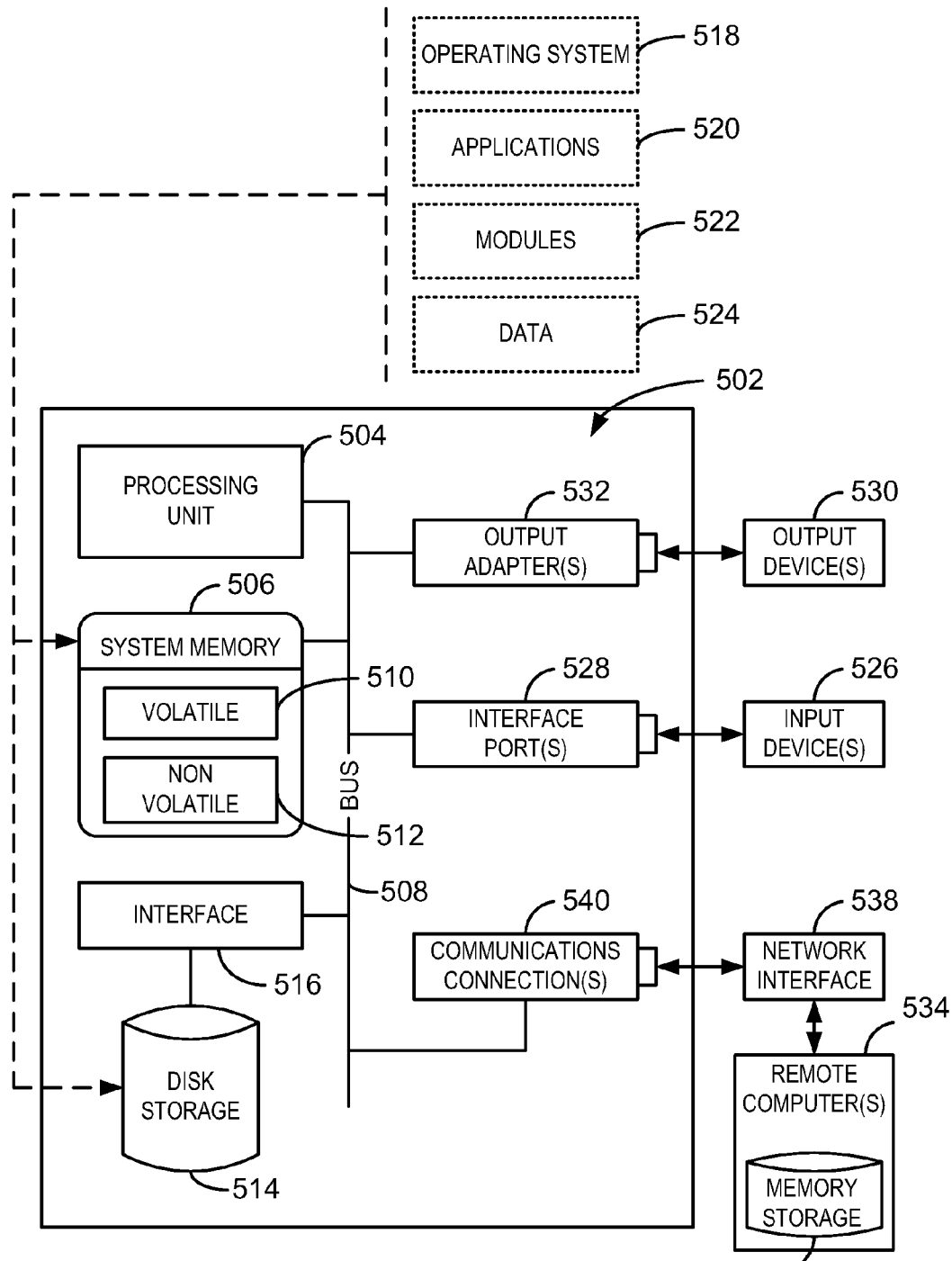
FIG. 5 is a block diagram of an exemplary operating environment for implementing various aspects of the claimed subject matter.

With reference to FIG. 5, an exemplary operating environment 500 is shown for implementing various aspects of the claimed subject matter. The exemplary operating environment 500 includes a computer 512. The computer 512 includes a processing unit 514, a system memory 516, and a system bus 518. In the context of the claimed subject matter, the computer 512 may be configured to enter technical formulas, display technical formulas, and display alternate input representations in other modalities for entered technical formulas.

The system bus 518 couples system components including, but not limited to, the system memory 516 to the processing unit 514. The processing unit 514 can be any of various available processors. Dual microprocessors and other multi-processor architectures also can be employed as the processing unit 514.

The system bus 518 can be any of several types of bus structure(s) including the memory bus or memory controller, a peripheral bus or external bus, and/or a local bus using any variety of available bus architectures known to those of ordinary skill in the art. The system memory 516 comprises non-transitory computer-readable storage media that includes volatile memory 520 and nonvolatile memory 522.

The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), or flash memory.

Volatile memory 520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 512 also includes other non-transitory computer-readable media, such as removable/non-removable, volatile/non-volatile computer storage media. FIG. 5 shows, for example a disk storage 524, which may include the interface 100, and the system 200 for entering technical formulas. Disk storage 524 includes, but is not limited to, devices like a magnetic disk drive, floppy disk drive, tape drive, LS-100 drive, flash drive, memory card, memory stick, etc.

In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in the suitable operating environment 500. Such software includes an operating system 528. Operating system 528, which can be stored on disk storage 524, acts to control and allocate resources of the computer system 512.

System applications 530 take advantage of the management of resources by operating system 528 through program modules 532 and program data 534 stored either in system memory 516 or on disk storage 524. It is to be appreciated that the claimed subject matter can be implemented with various operating systems or combinations of operating systems.

A user enters commands or information into the computer 512 through input device(s) 536. Input devices 536 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 536 connect to the processing unit 514 through the system bus 518 via interface port(s) 538. Interface port(s) 538 include, for example, a serial port, a parallel port, a game port, and a universal serial bus (USB).

Output device(s) 540 use some of the same type of ports as input device(s) 536. Thus, for example, a USB port may be used to provide input to the computer 512, and to output information from computer 512 to an output device 540.

Output adapter 542 is provided to illustrate that there are some output devices 540 like monitors, speakers, and printers, among other output devices 540, which are accessible via adapters. The output adapters 542 include, by way of illustration and not limitation, video and sound cards that provide a means of connection between the output device 540 and the system bus 518. It can be noted that other devices and/or systems of devices provide both input and output capabilities such as remote computer(s) 544.

The computer 512 can be a server hosting various software applications in a networked environment using logical connections to one or more remote computers, such as remote computer(s) 544. The remote computer(s) 544 may be client systems configured with web browsers, PC applications, mobile phone applications, and the like.

The remote computer(s) 544 can be a personal computer, a server, a router, a network PC, a workstation, a microprocessor based appliance, a mobile phone, a peer device or other common network node and the like, and typically includes many or all of the elements described relative to the computer 512.

For purposes of brevity, only a memory storage device 546 is illustrated with remote computer(s) 544. Remote computer(s) 544 is logically connected to the computer 512 through a network interface 548 and then physically connected via a communication connection 550.

Network interface 548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to the computer 512. The hardware/software for connection to the network interface 548 may include, for exemplary purposes only, internal and external technologies such as, mobile phone switches, modems including regular telephone grade modems, cable modems and DSL modems, ISDN adapters, and Ethernet cards.

An exemplary processing unit 514 for the server may be a computing cluster comprising Intel® Xeon CPUs. The disk storage 524 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for entering a technical formula, comprising:
   receiving a sequence of inputs on a computing device, wherein the sequence of inputs specifies the technical formula;
   displaying the technical formula in response to receiving the sequence of inputs;
   determining an alternate sequence of inputs that specify the technical formula based on the sequence of inputs received, and, which may be input to the computing device to display the technical formula; and
   displaying the alternate sequence, wherein an equivalent alternate input is highlighted within the display as an input is received from the sequence of inputs as feedback, the equivalent alternate input being associated with a different input modality than an input modality of the sequence of inputs received.

2. The method recited in claim 1, wherein a plurality of alternate input sequences specifies the technical formula in a corresponding plurality of input modalities.

3. The method recited in claim 2, wherein the plurality of input modalities comprises:
   handwriting;
   gestures;
   pointer selections;
   keyboard entries;
   speech; or
   combinations thereof.

4. The method recited in claim 1, wherein the technical formula comprises symbols without keyboard equivalents.

5. The method recited in claim 4, wherein the symbols comprise:
   mathematical symbols;
   mathematical functions;
   chemical symbols; and
   combinations thereof.

6. The method recited in claim 1, wherein the sequence of inputs comprises escape codes, physical human expressions, spoken sounds, keyboard-entered characters.

7. The method recited in claim 1, comprising:
   receiving a first part of the technical formula; and
   determining a second part of the technical formula based on the first part.

8. The method recited in claim 7, wherein determining the second part of the technical formula comprises:
   determining an expression for the sequence of inputs; and
   determining a production rule for the expression.

9. The method recited in claim 1, wherein determining the alternate sequence of inputs comprises determining a plurality of alternate sequences.

10. The method recited in claim 1, comprising processing the technical formula.

11. The method recited in claim 10, wherein processing the technical formula comprises:
    calculating a mathematical formula; and
    displaying a graph based on the calculated mathematical formula.

12. The method recited in claim 1, comprising sending a representation of the alternate sequence of inputs via:
    email;
    text message;
    chat message;
    social networking communication; and
    a cache storage at a client of a user entering the sequence of inputs.

13. The method recited in claim 1, comprising:
receiving a first part of the technical formula entered in a first input modality; and
receiving a second part of the technical formula entered in a second input modality.

14. The method recited in claim 1, comprising receiving one or more parts of the technical formula, wherein each of the one or more parts is entered in one or more input modalities.

15. A system for entering a technical formula, comprising:
a processing unit; and
a system memory, wherein the system memory comprises code configured to direct the processing unit to:
receive a sequence of inputs on a computing device, wherein the sequence of inputs specifies a first part of a technical formula;
determine a second part of the technical formula based on the sequence of inputs;
display the second part of the technical formula based on the first part;
determine an alternate sequence of inputs that specify the technical formula based on the sequence of inputs received, and, which may be input to the computing device to display the technical formula; and
present the alternate sequence, wherein an equivalent alternate input is highlighted within the display as an input is received from the sequence of inputs as feedback, the equivalent alternate input being associated with a different input modality than an input modality of the sequence of inputs received.

16. The system recited in claim 15, wherein the code configured to determine the second part of the technical formula comprises code configured to direct the processing unit to:
determine an expression for the sequence of inputs; and
determine a production rule for the expression.

17. The system recited in claim 15, comprising code configured to direct the processing unit to:
receive the first part of the technical formula entered in one or more input modalities; and
receive the second part of the technical formula entered in one or more input modalities.

18. The system recited in claim 15, wherein the alternate sequence of inputs is presented:
as a display on the computing device;
as audio from the computing device;
or combinations thereof.

19. The system recited in claim 15, wherein a plurality of alternate input sequences specify the technical formula in a corresponding plurality of input modalities.

20. One or more computer-readable storage media, comprising code configured to direct a processing unit to:
receive a sequence of inputs on a computing device, wherein the sequence of inputs specify a technical formula comprising a first part entered in a first input modality and a second part entered in a second input modality;
determine the technical formula based on the sequence of inputs;
display the technical formula;
determine an alternate sequence of inputs that specify the technical formula based on the sequence of inputs received in the first modality, and, which may be input to the computing device to display the technical formula; and
present the alternate sequence in the second input modality, wherein an equivalent alternate input is highlighted within the display as feedback in the second input modality as an input is received from the sequence of inputs in the first input modality, wherein the first and second input modalities are different from each other.

* * * * *